United States Patent [19]

Heimann

[11] Patent Number: 5,581,922

[45] Date of Patent: Dec. 10, 1996

[54] DISPLAY SYSTEM

[75] Inventor: Lindalou L. Y. Heimann, Omaha, Nebr.

[73] Assignee: Harold Mangelsen & Sons, Inc., Omaha, Nebr.

[21] Appl. No.: 371,953

[22] Filed: Jan. 12, 1995

[51] Int. Cl.⁶ .................................................... G09B 1/40
[52] U.S. Cl. .............................. 40/605; 40/729; 40/730; 434/172
[58] Field of Search ..................... 40/605, 152, 152.1, 40/729, 730; 446/111, 112, 108; D11/157, 133; D6/307; 434/172

[56] References Cited

U.S. PATENT DOCUMENTS

| 3,822,487 | 7/1974 | Kock | 434/172 |
|---|---|---|---|
| 5,186,672 | 2/1993 | Tung | 446/108 X |

FOREIGN PATENT DOCUMENTS

| 1212875 | 3/1960 | France | 40/152.1 |
|---|---|---|---|
| 2200980 | 7/1973 | Germany | 446/111 |
| 749444 | 3/1956 | United Kingdom | 434/171 |

*Primary Examiner*—Kenneth J. Dorner
*Assistant Examiner*—Cassandra Davis
*Attorney, Agent, or Firm*—Zarley, McKee, Thomte, Voorhees & Sease; Mark D. Frederiksen

[57] ABSTRACT

A display system includes a plurality of alphnumeric characters having apertures formed along side walls and upper and lower surfaces for receipt of pegs to interconnect characters. Each character is preferably formed from an identical blank, such that each character has a height portion extending entirely from the top to bottom of the blank, and a width portion extending extirely from the left side wall to the right side wall of the blank. Three uniformly spaced apertures are located in each blank along the side walls and the upper and lower walls. The apertures are only formed in the height and width portion of the characters which correspond with the locations of the apertures on the blanks. Pegs inserted between aligned apertures and abutting characters permits connection of the characters in horizontally aligned or vertically displaced orientation with respect to one another.

5 Claims, 5 Drawing Sheets

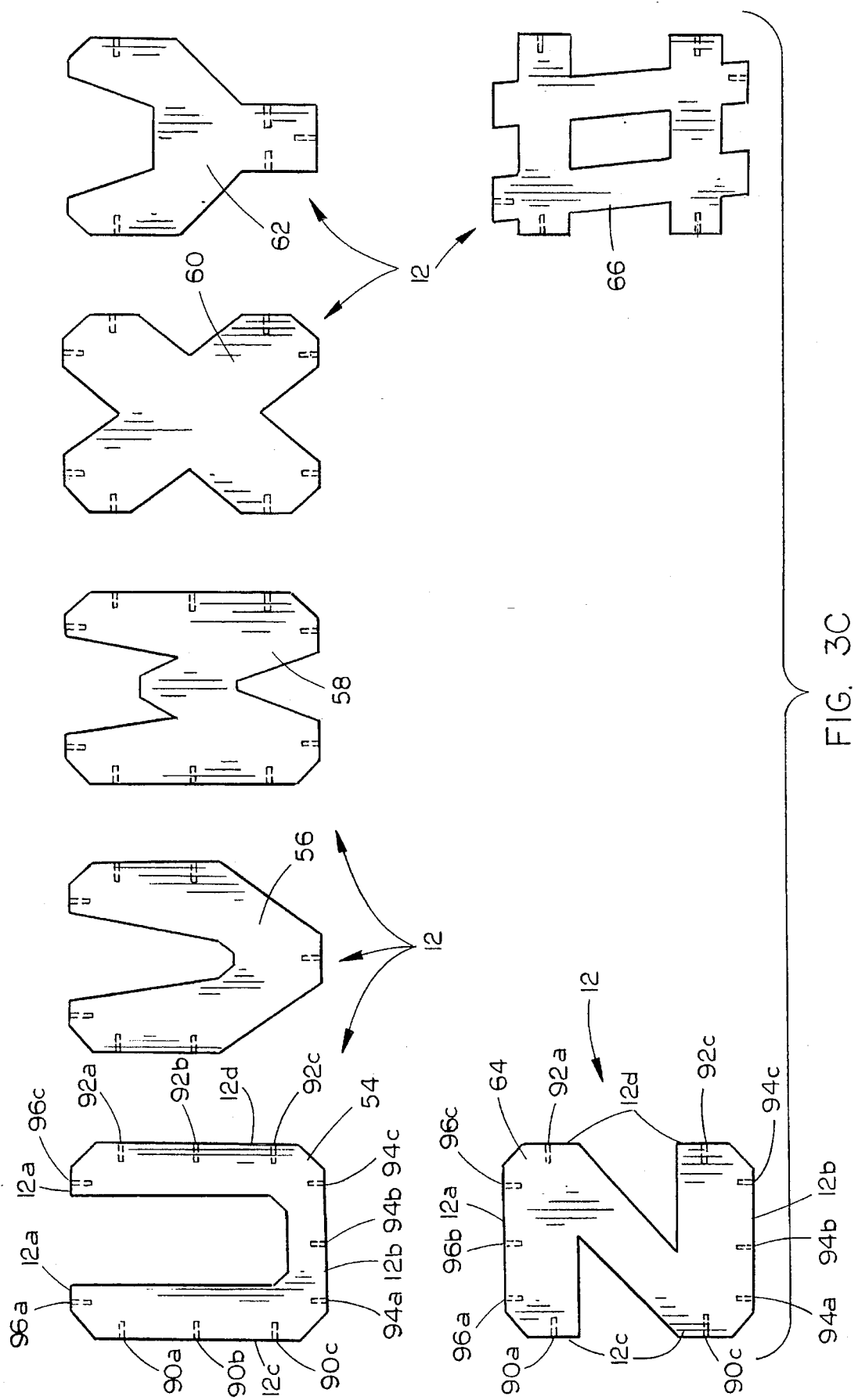

5,581,922

DISPLAY SYSTEM

TECHNICAL FIELD

The present invention relates generally to a system for displaying miniature craft items, and more particularly to an improved display system of interconnectable alphanumeric characters.

BACKGROUND OF THE INVENTION

Various shadow boxes and other collector boxes are currently available for displaying miniature craft items, hobby collectibles and other novelties. While prior art collector boxes typically provide various size "cubicles" for the display of items, the conventional collector's box is virtually always rectangular in overall shape and does not interrelate with the items placed within the box.

In addition, conventional collector boxes are limited in the types of items which may be attached or displayed therein, because of the conventional shape of the cubicles provided in the box.

SUMMARY OF THE INVENTION

It is therefore a general object of the present invention to provide an improved display system of interconnectable alphanumeric characters to form words and phrases relating to items displayed on the characters.

Another object of the present invention is to provide a display system of alphanumeric characters which is modular and interconnectable to vertically stagger the interconnected characters.

Still another object is to provide a display system of interconnectable alphanumeric characters which are modular so as to interconnect with all other characters in the system.

A further object of the present invention is to provide a display system of alphanumeric characters which is simple to interconnect, economical to manufacture, and modular to provide versatility and personalization.

These and other objects will be apparent to those skilled in the art.

The display system of the present invention includes a plurality of alphnumeric characters having apertures formed along side walls and upper and lower surfaces for receipt of pegs to interconnect characters. Each character is preferably formed from an identical blank, such that each character has a height portion extending entirely from the top to bottom of the blank, and a width portion extending extirely from the left side wall to the right side wall of the blank. In the preferred embodiment of the invention, three uniformly spaced apertures are located in each blank along the side walls and the upper and lower walls. Preferably, the apertures are only formed in the height and width portion of the characters which correspond with the locations of the apertures on the blanks. Pegs inserted between aligned apertures and abutting characters permits connection of the characters in horizontally aligned or vertically displaced orientation with respect to one another.

BRIEF DESCRIPTION OF THE DRAWINGS

FIG. 3C is a front elevational view of the succeeding characters of the display system.

DESCRIPTION OF THE PREFERRED EMBODIMENT

Figure 1:
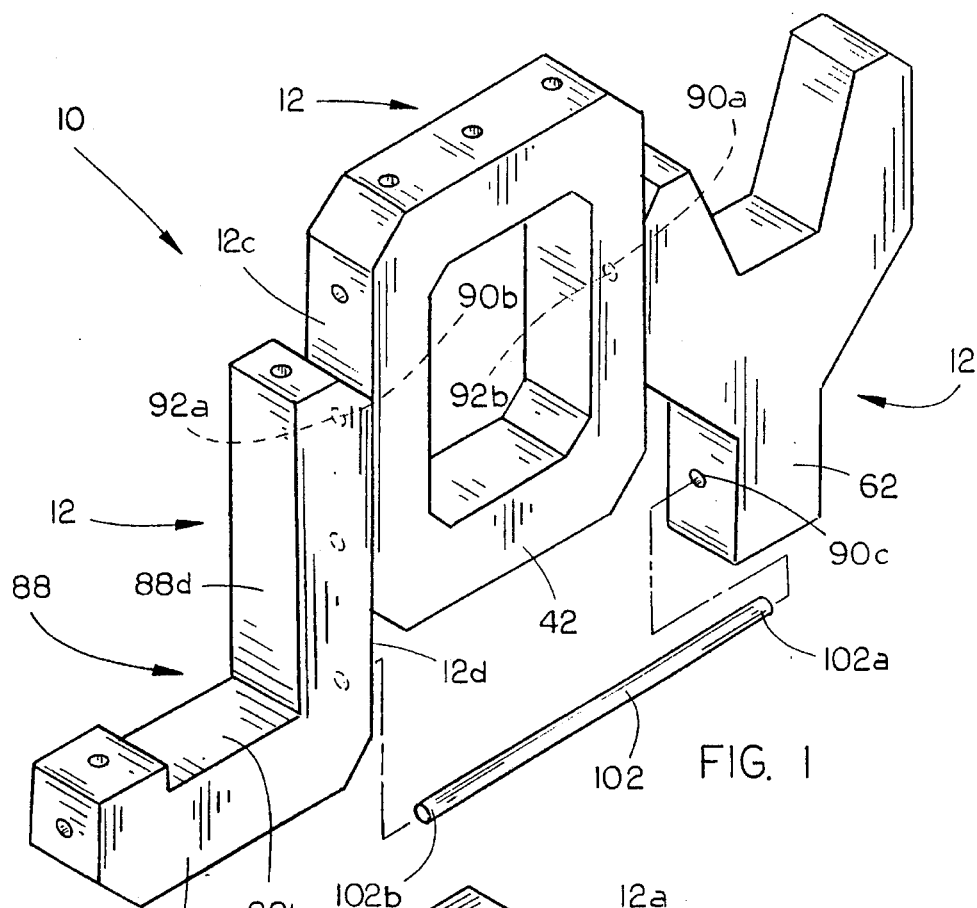
FIG. 1 is a perspective view of the display system of the present invention, showing three interconnected alphanumeric characters.

Referring now to the drawings, in which similar or corresponding parts are identified with the same reference numeral, and more particularly, to FIG. 1, the display system of the present invention is designated generally at 10 and includes a plurality of interconnectable modular alphanumeric characters 12 connected together to form a customized design. FIG. 1 shows three alphanumeric characters 12 connected to form the word "JOY". For ease of description, each alphanumeric character 12 will be identified with a separate reference numeral, as shown in FIGS. 3A, 3B, 3C and 3D. Thus, each letter A–Z is identified with reference numerals 14–64, respectively. The number sign is identified with reference numeral 66, and numerals 0–9 are identified with reference numbers 68–86. Thus, in FIG. 1, characters 12 are more specifically identified as characters 32, 42 and 62, respectively.

Figure 2:
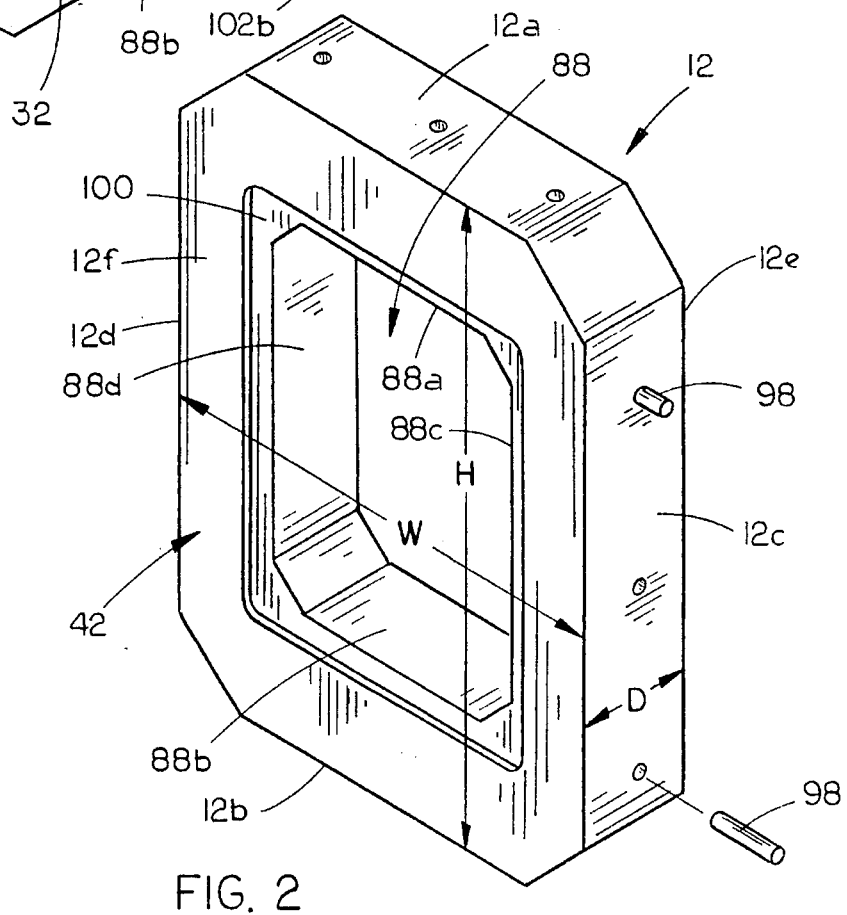
FIG. 2 is a rearward perspective view of one alphanumeric character showing the interconnecting fastener system.
Figure 3A:
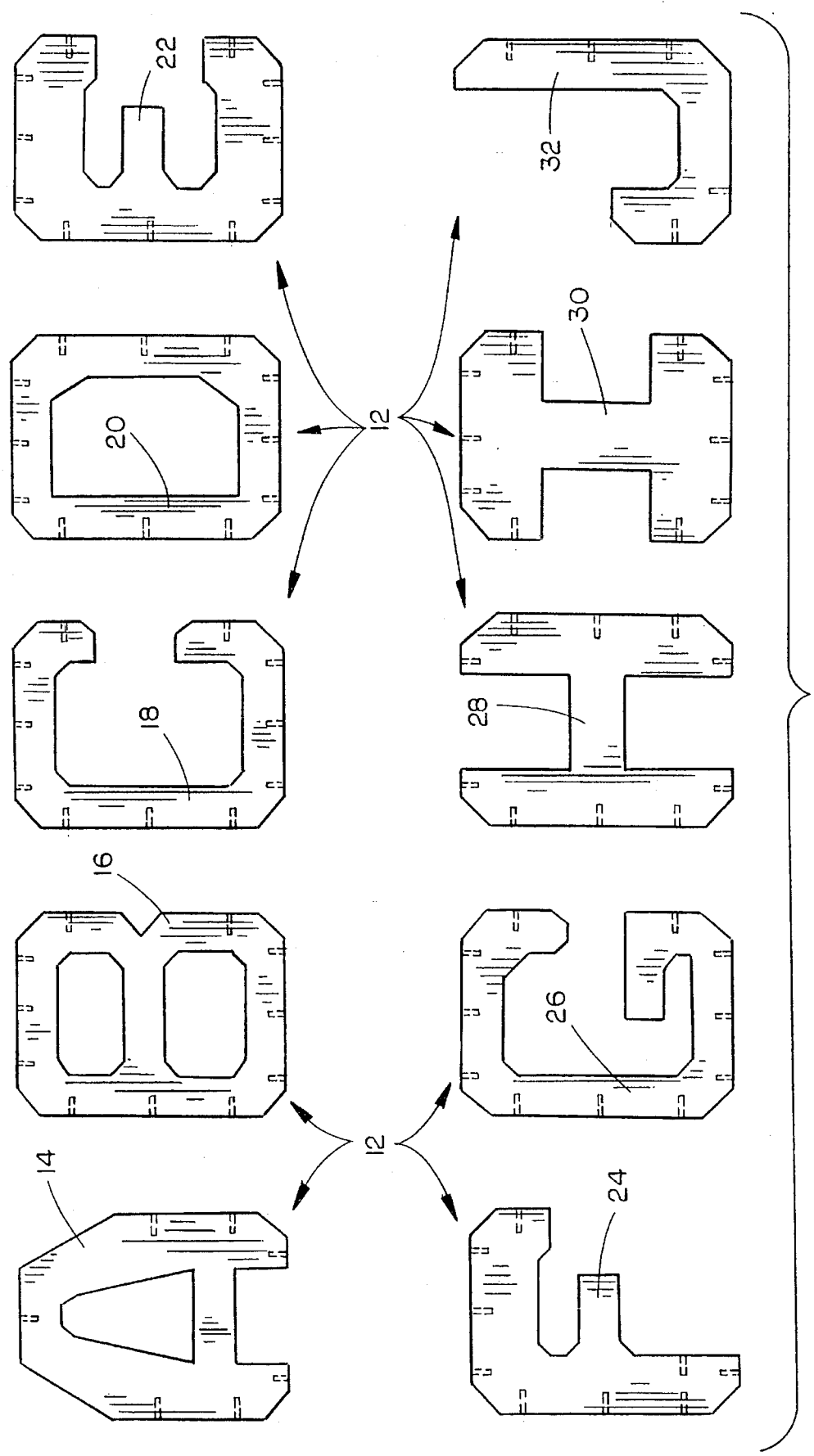
FIG. 3A is a front elevational view of the first ten characters of the display system.
Figure 3B:
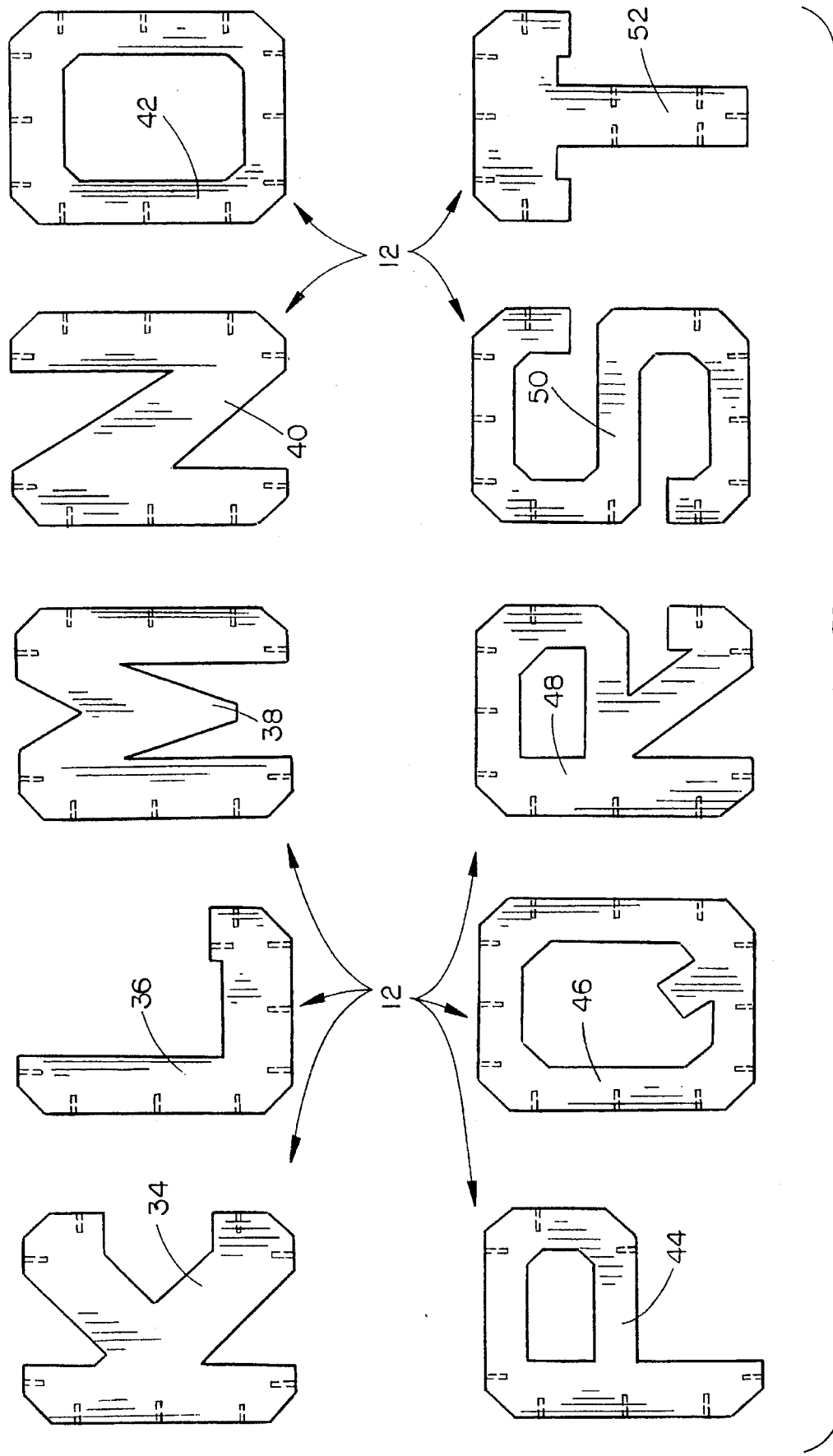
FIG. 3B is a front elevational view of the second ten characters of the display system.
Figure 3D:
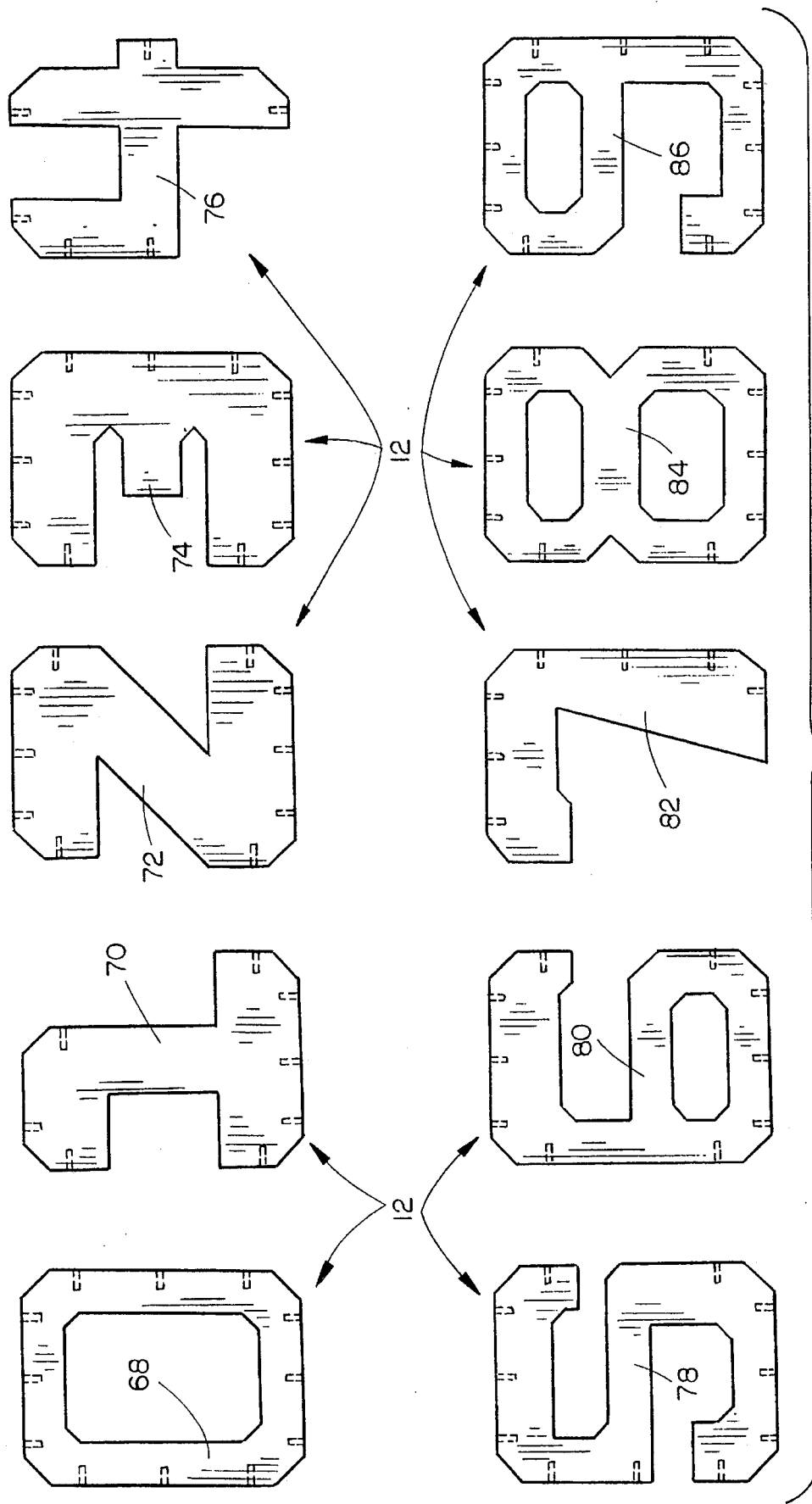
FIG. 3D is a front elevational view of the last ten characters of the display system.

Referring now to FIG. 2, each alphanumeric character 12 includes a top 12a, bottom 12b, left vertical side wall 12c and right vertical side wall 12d. Each character 12 is modular, in that the overall width W between side walls 12c and 12d is the same for every letter, the overall height H measured between top and bottom 12a and 12b is the same for every character, and the depth D, measured between the front face 12e and rear face 12f, is the same for every character 12. While the location of the various top, bottom and side walls may be different for each character 12, these basic wall structures are present in every character. In addition, many characters 12 include an interior area 88 which may be enclosed by upper and lower walls 88a and 88b, and side walls 88c and 88d, as shown in FIG. 2 by character 42. In the alternative, interior area 88 may be open, as is the case with character 32, shown in FIG. 1, having only one side wall 88d and a bottom wall 88b.

Referring now to FIG. 3C, the alphanumeric character 54 is an example of a letter having two full length side walls 12c and 12d, as well as a full width bottom 12b. Side wall 12c includes an upper, middle, and lower aperture 90a, 90b and 90c, respectively, formed therein. Central aperture 90b is located midway between the top and bottom 12a and 12b of character 54. Upper aperture 90a is located midway between top 12a and central aperture 90b, while lower aperture 90c is located midway between central aperture 90b and bottom 12b. An upper, central and lower aperture 92a, b and c, respectively, are formed in right side wall 12d coaxial with apertures 90a, b and c.

Similarly, a left aperture 94a, central aperture 94b and right aperture 94c are formed in bottom 12b of character 12. Central aperture 94b is located midway between side walls 12c and 12d, left aperture 94a is located midway between left wall 12c and central aperture 94b, and right aperture 94c is located midway between central aperture 94b and right side wall 12d.

Because character 54 does not have a full width top 12a, only a left aperture 96a and a right aperture 96c are formed in the top 12a thereof, coaxial with left and right apertures 94a and 94c in bottom 12b.

Because most of alphanumeric characters 12 do not include a full dimension side wall 12c and 12d, or a full dimension top and bottom wall 12a and 12b, the various apertures along the top, bottom and side walls of each character 12 are only located in corresponding positions of portions of the associated walls. For example, character 64, the "Z" has full dimension top and bottom walls 12a and 12b and therefore includes three upper apertures 96a, 96b and 96c matching the lower apertures 94a, 94b and 94c. However, character 64 has only partial side walls 12c and 12d, and therefore has side apertures located only where the associated side wall extends to the full right or left dimension at the predetermined location of the apertures. In this case, character 64 includes upper and lower apertures 90a, 92a, 90c and 92c along side walls 12c and 12d respectively. Since every character 12 utilizes the same overall height and width dimensions H and W, the various apertures along the top, bottom and side walls are positioned based on the overall height and width dimensions, and then only on the particular top, bottom or side wall surface which reaches the full extent of the height and width dimensions at the locations of one of the predetermined apertures.

Referring once again to FIG. 2, pegs 98 are provided which permit the interconnection of alphanumeric characters 12. Pegs 98 have dimensions which require a press fit into the apertures of characters 12, such that glues or other adhesives are not necessary to interconnect the letters. This in turn permits rearrangement of the letters as desired by the consumer.

In order to permit the installation of photographs and the like on those characters 12 having a closed interior area 88, such as character 42 in FIG. 2, the rearward face 12f is routed to form a depression 100 entirely around the circumference of the interior area 88. Preferably, depression 100 is dimensioned to receive a standard photograph therein.

FIG. 1 shows a configuration of three characters 32, 42 and 62 interconnected to form the word, or name, "JOY". With the particular three characters utilized, it can be seen that the letter "O" 42 may be connected in three different positions along its left side 12c to the right side 12d of the letter "J" 32. In FIG. 1, character 42 is staggered vertically upwardly with its left side central aperture 90b aligned with the right side upper aperture 92a of character 32. Character 62 is horizontally aligned with character 32, with its left side upper aperture 90a connected to the right side central aperture 92b of character 42. In this way, a space is created between characters 32 and 62 below the center character 42, for the attachment of accessories such as towel rod 102, or merely for a desired staggered appearance.

Towel rod 102 includes a right end peg 102a and a left end peg 102b sized the same as pegs 98 for interconnecting the letters. In this way, right peg 102a may be inserted within left side lower aperture 90c of character 62, and left peg 102b may be inserted within the coaxially aligned right side lower aperture 92c of character 32.

Whereas the invention has been shown and described in connection with the preferred embodiment thereof, many modifications, substitutions and additions may be made which are within the intended broad scope of the appended claims. For example, the alphanumeric characters 12 may be formed to represent characters of other languages. The characters are modular to permit versatile arrangement and interconnectability, while providing a large amount of top surface area, as well as interior areas for supporting miniature novelty or collector items. Because the letters may be interconnected, various words or phrases may be formed relating to careers, holidays, hobbies, and various events such as birthdays, anniversaries, new babies, and the like. Because the letters provide support surfaces for novelties, the collectible items may be interchanged to interrelate with the word or phrase formed by the letters.

In addition, various accessory items may be provided with pegs to permit the attachment of accessories along the sides, without reducing the amount of support space for miniature collectibles.

Thus, there has been shown and described a display system which meets all of the above stated objects.

I claim:

1. A display system, comprising:

a plurality of three-dimensional alphanumeric characters representing at least each letter of an alphabet, each having opposing top and bottom surfaces, opposing side walls, and opposing front and rear faces;

said characters being equal in overall height, width and depth;

each character side wall including an upper portion, an intermediate portion and a lower portion, and each character having at least one flat vertical portion along each side wall coextending along at least one of the upper, intermediate and lower side wall portions; and means on each side wall for horizontal interconnection with other of said plurality of alpha-numeric characters along the flat vertical portions of the side walls thereof, including:

at least one aperture formed in each side wall vertical portion of each character; and a peg dimensioned for receipt in the side wall apertures of two adjacent and abutting characters.

2. The display system of claim 1, further comprising means for vertically interconnecting characters along the top and bottom surfaces thereof.

3. The display system of claim 2, wherein each character top and bottom surface includes a flat horizontal portion and said means for vertically interconnecting characters includes:

at least one aperture formed in each top and bottom surface flat horizontal portion of each character; and the peg dimensioned for receipt in the apertures in said top and bottom flat surfaces of two adjacent abutting characters.

4. The display system of claim 3, wherein at least one of said characters has a thickness and has an opening formed through the thickness thereof, intermediate the side walls and top and bottom surfaces, said opening having a circumferential wall therearound, and further comprising a depression formed in a rearward face extending around said opening in the circumferential wall.

5. The display system of claim 5, wherein said at least one aperture in each side wall vertical portion of each character has the same dimensions as said at least one aperture in each said top and bottom surface flat horizontal portion of each character, and wherein said peg of said means of horizontal connection has the same dimensions as said peg of said means of vertical connection.

\* \* \* \* \*